June 9, 1942.  C. A. HEILAND  2,286,170
SELECTOR SYSTEM FOR AMPLIFIERS
Filed July 26, 1937   2 Sheets-Sheet 2
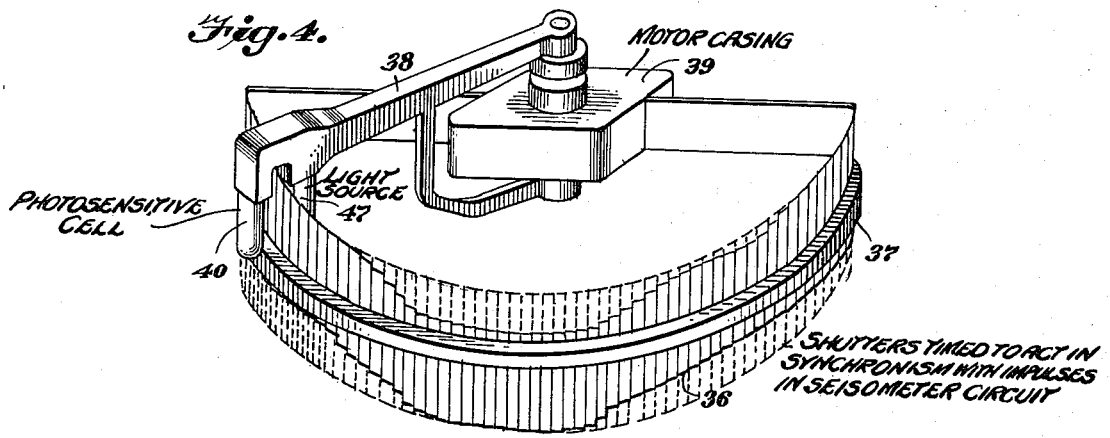
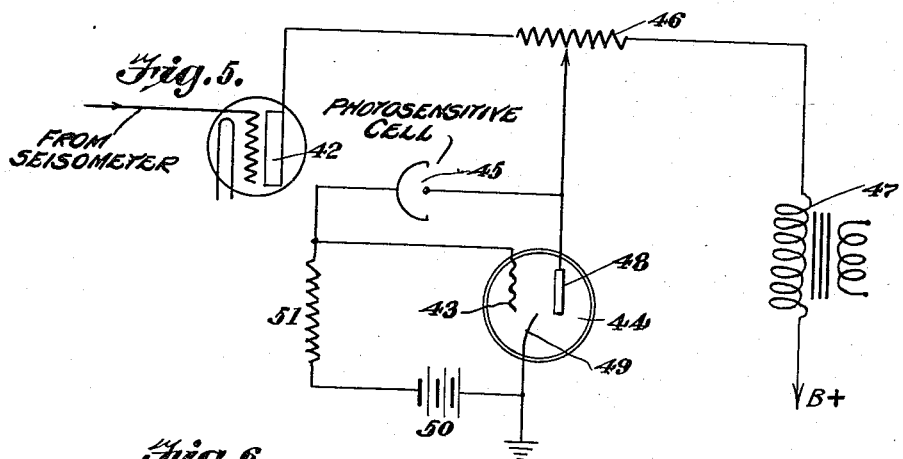
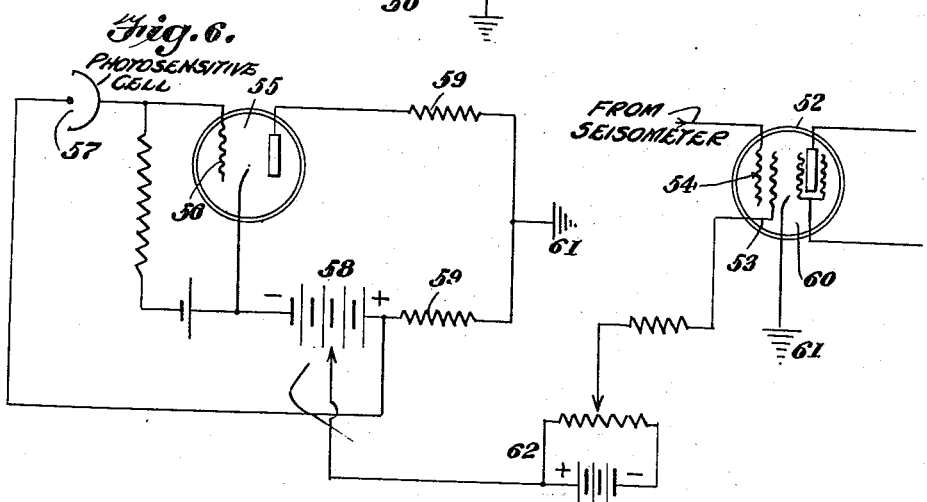
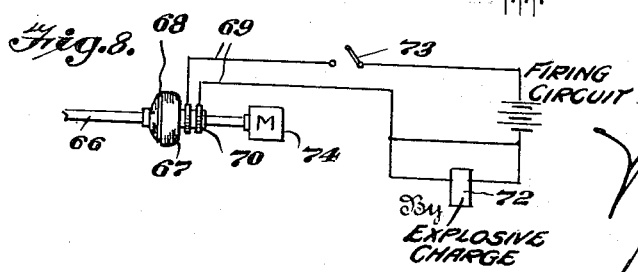
Inventor
C. A. HEILAND Patented June 9, 1942

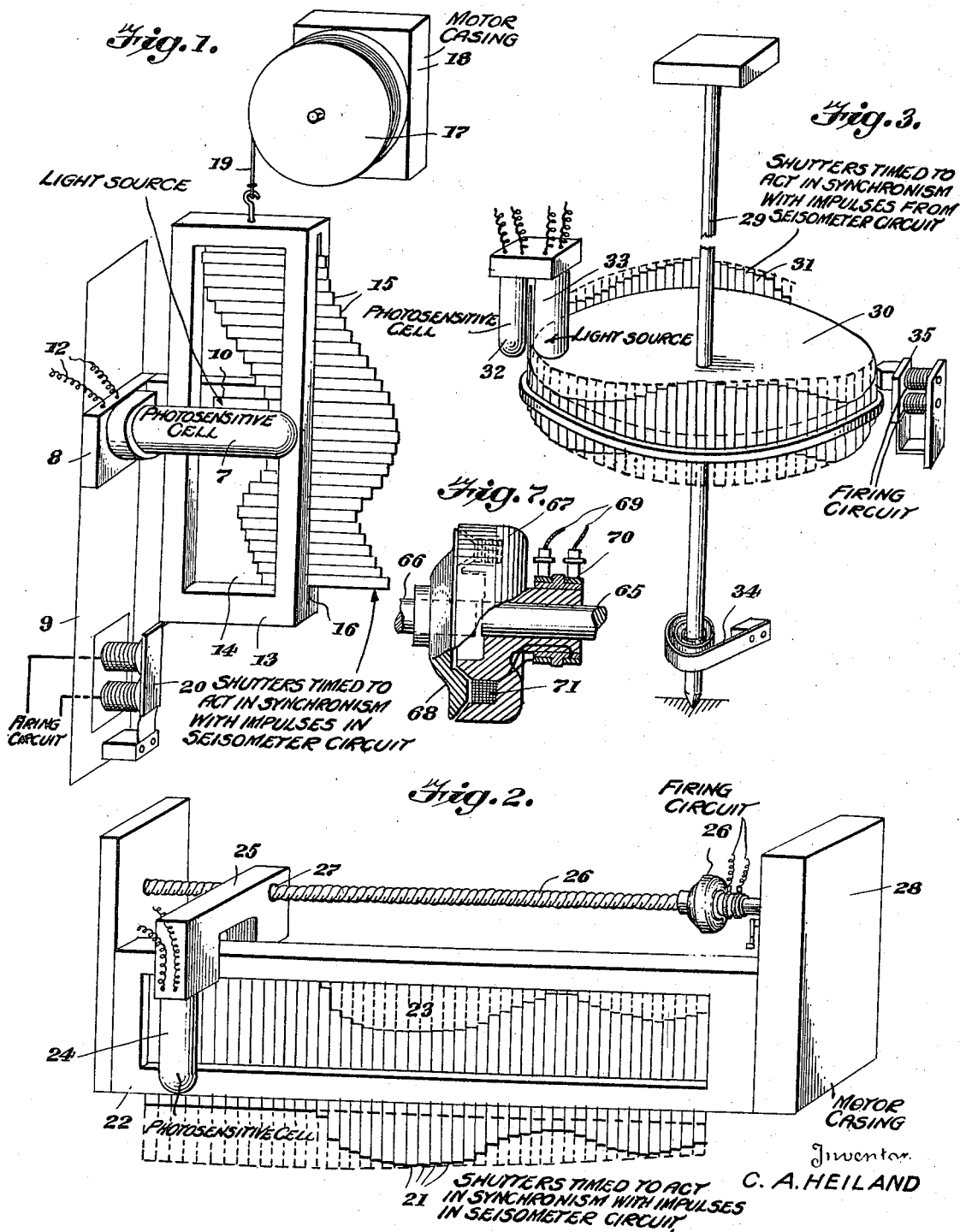

2,286,170

UNITED STATES PATENT OFFICE 2,286,170

SELECTOR SYSTEM FOR AMPLIFIERS

Carl A. Heiland, Denver, Colo., assignor to Heiland Research Corporation, Denver, Colo., a corporation of Colorado Application July 26, 1937, Serial No. 155,777

9 Claims. (Cl. 177—352)

The present invention in its broader aspect relates to a controlling device for electrical circuits. More particularly the invention is a controlling device, by means of which certain electrical impulses passing through a circuit may be selected.

The controlling device is useful in any circuit to which a series of impulses pass in a more or less definite timed relation. Its chief use is probably in connection with an amplifying system for amplifying a series of electrical impulses. By use of the device with an amplifying system, the degree of amplification which is given to each impulse may be controlled in such a manner that certain of the impulses will be amplified to the full power of the amplifying system, while others will be amplified to a lesser extent, or entirely prevented from passing completely through the system.

One particular field of use to which the invention is adapted is that of geophysical exploration. Such exploration is commonly undertaken by either an electrical system or a seismic method. In each of these systems energy is transmitted into the ground and received at suitably spaced points. In both of these methods the disadvantageous feature of absorption of the energy by the ground is encountered. The greater the spacing between transmitting and receiving points, the greater is the path and the depth that the energy, which is the factor to be measured, takes, and the amplitude of the received signals in both methods decreases with the depth explored.

Another difficulty encountered in such exploration methods is that a body of a given size is much less apt to be detected at a greater depth than at a smaller depth. It will be apparent from the above that as the depth to which the exploration is carried increases, the amplitude of the received signals decreases.

In seismic exploration there is an additional difficulty encountered. When a charge of dynamite or "shot" is fired near the surface, the energy received by a number of detectors at fixed distances from the shot point will consist first of waves which have traveled at or near the surface of the earth. Reflection from various strata or beds will follow, the energy having taken a longer path to and from the beds than that which passes near the surface. The times at which the reflected waves arrive will be proportional to the depths of the surfaces reflecting them. In both electrical and seismic work it frequently occurs that certain effects are recorded at undesirable times and such effects, on account of their magnitude, sometimes obscure or interfere with subsequent or preceding impulses on which the interpretation must be based. In electrical work these effects may be the result of conducting bodies, such as disseminated sulphides, or salt water beds or fissures without structural significance or interest. In seismic work the undesirable effects may be due to the surface waves or to reflections from strata or bodies having no commercial interest or significance.

One use for the present invention is the elimination of such undesirable effects from the record of the receipt of the energy impulses.

Ordinarily the existence of bodies, in the detection of which the exploration is not concerned, are known, or may be readily determined, and their depth fixed with sufficient accuracy to render their elimination possible.

The primary object of the invention is to provide a novel form of controlling device for an electric circuit through which a series of impulses pass in a certain timed sequence, whereby the effect of certain of the impulses may be eliminated. This object is accomplished by connecting with the circuit a second circuit so arranged that when the second circuit is closed, the passage of electric current through the first circuit will be interfered with. A light sensitive cell is interposed in the second circuit, and means are provided whereby light is supplied to the light sensitive cell in intensities that vary in a predetermined manner and in timed relation to the impulses passing through the first circuit.

Another object of the invention is to provide a novel device for controlling the light falling upon a light sensitive cell and varying the intensity of the light in a predetermined manner and at predetermined timed intervals.

To control the operation of a light sensitive cell a series of adjustable shutters is passed through the light beam falling upon the cell, in such a manner that each shutter intercepts a certain portion of the light beam. The shutters are carried through the beam at a determined rate of speed so that by a suitable adjustment of each shutter the amount of light reaching the cell at any given instant may be controlled in a predetermined fashion.

In the accompanying drawings:

Figure 1 is a perspective view of one embodiment of the invention.

Figure 2 is a perspective view of a modified form of the embodiment shown in Figure 1.

Figure 3 is a perspective view of a different embodiment.

Figure 4 is a perspective view of a modification of the form of embodiment shown in Figure 3.

Figure 5 is a circuit diagram showing one manner of connecting the controlling device to an amplifying system.

Figure 6 is a circuit diagram of another method of connecting the controlling device to an amplifying system.

Figure 7 is a detail elevation showing an electrical clutch for starting the device.

Figure 8 is a diagrammatic view of an electrical control system.

Describing the drawings more particularly, and considering first the embodiment shown in Figure 1, a light sensitive cell is illustrated at 7, mounted upon a base 8 on a vertically disposed support 9. Horizontally spaced from the cell 7 is a light source at 10 arranged to throw a beam of light upon the cell 7 to allow current to flow through the circuit wires 12.

In order to vary the amount of light falling upon the cell 7, and consequently to vary the current which is permitted to pass through the cell and the circuit, a vertically movable frame 13 is interposed between the light source 10 and the cell 7. The frame 13 has a central opening 14 for the pasage of the light beam, and means are provided for obstructing portions of the opening 14 so that a portion of the light beam will be intercepted and prevented from reaching the cell 7. Advantageously these means may take the form of shutters 15.

In the embodiment shown in Figure 1, one of the side members of the frame 13 is provided with a longtiudinally extending slot 16, and the shutters 15, which are in the form of long, rectangular, and narrow strips, are slidably mounted in side-by-side relation in the slot. The portion of the light beam which is intercepted by each of the shutters may be easily adjusted by moving the individual shutters inwardly or outwardly with respect to the frame. A typical arrangement is shown in Figure 1, where it will be seen that as the frame travels downwardly, at first the amount of light reaching the cell will be increased, then decreased, and finally increased again.

The movement of the frame 13 may be controlled by a drum 17 that is allowed to revolve at constant speed by a clock-work escapement or other, synchronous mechanism for rotating the drum at a constant speed, such mechanism being contained in a case 18. A cord 19 connects the frame 13 and drum 17.

In order to control the release of the frame 13 to begin its downward motion, any suitable catch device may be provided. In this instance an electro-magnetically operated stop 20, adapted to engage the bottom of the frame, is shown. Inasmuch as it is desired to start the operation of the device in synchronism with the impulses whose passage through a circuit is to be controlled, the operation of the releasing device 20 is preferably synchronized with the operation of such circuit. Thus in a seismic exploration system, the magnetic catch 20 would be connected with the shot-firing system in such a manner as to release the catch at the instant of firing the shot.

The speed of the descent of the frame 13 is regulated by the mechanism within the casing 18, so that the time interval which has elapsed when any certain one of the shutters 15 reaches the light beam, is definitely fixed, and therefore, by the longitudinal sliding adjustment of each of the shutters in the slot, the amount of light reaching the cell 7, and consequently the amount of current flow in the circuit, at any given instant may be controlled. A satisfactory speed in relation to the width of the shutters is such that the passage of each shutter through the beam requires one-tenth of a second. Therefore if it is desired to create a certain current flow through the circuit 12 one second after the beginning of the operation, the tenth shutter from the beginning will be adjusted to pass sufficient light to the cell 7 to permit the desired current to flow through the cell.

In Figure 2 a modification of the embodiment shown in Figure 1 is illustrated. In this embodiment the shutters 21 are supported in a stationary frame 22 having an opening 23, into which the shutters may be projected the desired distance. A light sensitive cell 24 is supported upon one side of the frame 22 on a movable carriage 25, and a source of light is supported upon the carriage 25 on the opposite side of the frame in such a manner as to cast a beam of light upon the cell 24 through the opening 23. The carriage 25 may be moved longitudinally of the frame 22 by suitable means, shown in Figure 2, as a threaded shaft 26 running parallel to and above the longitudinal members of the frame 22 and passing through a threaded opening 27 in the carriage.

A continuously running synchronous motor for driving the shaft 26 may be enclosed in the casing 28, and an electrical clutch 26a interposed between the shaft and the motor to control the rotation of the shaft 26. The shaft 26, being revolved at a constant speed, the carriage 25 moves at a constant speed past the shutters 21 which intercept varying portions of the light beam thrown by the light source upon the cell 24. The clutch may be operated by the firing circuit.

In Figure 3, an embodiment is disclosed which is advantageous for use where high speeds are required. In this embodiment, a rotatable shaft 29 is vertically disposed, and carries a disk support 30. The series of shutters 31 may be adjustably mounted about the periphery of the disk 30 in any suitable manner, provided that they are longitudinally adjustable in a vertical direction. A light sensitive cell 32 is mounted adjacent the periphery of the supporting disk 30 in such a position that the shutters 31 may pass between it and a light source, as at 33.

To drive the shaft 29 and disk 30, a spring 34 may be connected to the shaft, and an electro-magnetic releasing device 35 may be employed to engage the disk to prevent its rotation until the magnetic device is released.

In Figure 4 a modification of the embodiment as shown in Figure 3 is illustrated. In this form the series of shutters 36 is stationary, being adjustably mounted upon a support 37. A swinging arm 38, driven by a motor enclosed in a casing 39, carries the light sensitive cell 40 and source of light 41. As the arms swing from one end of the series of shutters to the other, the shutters will, due to the varying amounts which they project upwardly between the cell and source of light, intercept different portions of the light beam, and permit varying intensities of current to flow through the circuit in which the light sensitive cell is connected.

In Figure 5 a circuit is illustrated disclosing one method, by means of which the above described light sensitive cell control may be used.

The plate of an amplifying tube is illustrated at 42.

The grid 43 of a triode 44 is connected to the cathode of a light sensitive cell 45, while the plate is connected with its anode, a resistor 46, and, through the primary 47 of an audio frequency transformer, to the positive terminal of a B battery. The plate 48 of the triode is also connected through the resistor 46 to the plate 42 of the amplifying tube. The cathode 49 of the triode is grounded and is connected through the bias battery 50 and resistor 51 to the grid, and to the cathode of the phototube.

The operation of this circuit is as follows: When no light is falling upon the light sensitive cell 45 the operation of the plate circuit connected with the plate 42 is not interfered with, and all of the impulses passing through the plate circuit are amplified to the full power of the system. When, however, light falls on the light sensitive cell, a positive charge from the B battery is built up on the grid 43, the strength of this charge depending upon the amount of light falling on the cell. As the positive charge on the grid 43 increases, the conductance of the triode 44 increases and a proportional amount of the current from the plate circuit of the amplifying system is bypassed to the ground. The amount of current so bypassed is proportional to the amount of light falling upon the light sensitive cell, and therefore, as the passage of the shutters through the light beam is timed with relation to the impulses, the adjustment of a shutter passing through the light beam at the time of passage through the amplifying circuit of any given impulse, determines the degree of amplification of that impulse.

When any of the photoelectric cell controls disclosed in Figures 1-4 inclusive is applied to the cell 45, the positive charge upon the grid 43 varies according to the amount of the light beam which is intercepted by the shutter, which at that instant is passing between the light source and the cell. As the passage of the shutters through the light beam is synchronized with the impulses of the plate current from the plate 42, the setting of the shutters determines whether that impulse shall be bypassed to the ground, whether it shall pass to the primary 47 in undiminished condition, or whether it will be merely weakened and passed to the primary. For example, with the shutter arrangement shown in Figure 1, if the travel of the frame 13 is started at the shot instant of a seismic system, the first impulse to reach the receiving station, which will be the surface waves, will be eliminated from the record, because a substantial amount of light is permitted to reach the cell, and this light causes the operation of the circuit to bypass the impulses in question.

In Figure 6, another system is shown for making use of the light sensitive cell control. In this system, instead of bypassing certain of the impulses to the ground, use is made of a pentode 52 having a second control grid 53. The signal current is led to the grid 54.

In this case also a triode 55 is employed, such triode having a grid 56 connected through a light sensitive cell 57 to the positive terminal of a battery 58. The triode is so biased that no plate current flows when no light falls on the cell 57. When a beam of light, the size of which is controlled by the adjustment of the shutters that pass through it strikes the cell 57, proportional voltages are produced across the resistors 59 in the plate circuit. The grid controlling the plate current flow in an amplifying tube, in this case, a second control grid 53 of the pentode 52 and the cathode 60 through the grounds 61, are tied into the plate circuit of the triode in such a manner that their relative potentials are varied in proportion to the light falling on the light sensitive cell 57. By the battery and potentiometer arrangement shown in Figure 6, at 62, the second control grid is so biased that no plate current flows through the pentode when the light sensitive cell receives no light. In other words, when no light falls on the light sensitive cell, the grid 53 becomes negatively charged. When the light sensitive cell receives the maximum amount of light, the maximum amplification by the pentode occurs.

The circuit shown in Figures 5 and 6 illustrate examples of circuits that may be used with the light sensitive cell and its control for varying the light beam falling thereon. Many other arrangements of circuits and of various types of vacuum tubes may be employed.

Figures 7 and 8 disclose an operating arrangement for the control of the moving portion of the device. Such a system may be used with any of the different forms shown, although it is illustrated as embodied in the form disclosed in Figure 2. In this arrangement, instead of a clockwork or spring motor controlled by an electric release, a constantly running motor is used with an electric clutch for clutching the motor to the shaft at the instant that it is desired to set the device in operation. The motor is preferably of the type that runs at a constant speed in order that the speed of travel of the moving part of the device may be at a definite rate.

In Figure 7 the shaft of a motor is designated 65 and the driving shaft of the selector device 66. The adjacent ends of the shafts 65 and 66 carry driving and driven elements 67 and 68, respectively, of an electrically operated clutch of suitable design. The operation of the clutch is controlled through circuit wires 69 connected through a slip ring 70 to a magnetic device 71 in such manner that when the circuit is closed, the clutch members will be engaged, and the shaft 66 started. Obviously any of the various embodiments may be constructed with such a driving arrangement.

In Figure 8 a desirable circuit is illustrated for the control of the clutch. The circuit includes an electrical firing device for the explosive charge 72 that is used for setting up the waves to be recorded, the clutch magnet 71, and a switch 73. Upon closing the switch 73, the charge 72 will be exploded, and the shaft 66 will be connected to the running motor 74, setting the selector device in operation.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim is:

1. In a geophysical prospecting system that includes means for measuring and recording the amplitude of waves after their passage through the earth being surveyed and including a circuit for transmitting electrical impulses from a detector to a recorder; means for preventing operation of the recording device by insignificant waves that reach the pickup device at definite intervals during the arrival of the significant waves, said means comprising a second circuit connected with the transmitting circuit and arranged to attenuate signals transmitted by the said transmitting circuit to an amplitude insufficient to operate the recorder when the said second circuit is energized, a time-controlled mechanism for energizing the said second circuit at intervals in predetermined sequence, and means for setting the said time-controlled mechanism in operation in synchronism with the arrival of waves at the detector.

2. In a seismic prospecting system including an electrically actuated device for propagating waves in the earth, a pickup device for transforming such waves to electrical impulses, a translating device for translating such impulses to intelligible signals, and a transmitting circuit having an input connected with the pickup and an output connected with the translating device for passage of the electrical impulses, means for diminishing the effect upon the translating device of impulses due to insignificant waves arriving at the pickup device in predetermined sequence after actuation of the wave-propagating device, said means comprising a second circuit connected with the transmitting circuit between the input and the output thereof and arranged to decrease the intensity of impulses delivered by the transmitting circuit at its output when said second circuit is energized, and means connected with and set in operation by actuation of the wave-propagating device for energizing the second circuit in predetermined sequence and synchronously with the passage in the transmitting circuit of impulses due to the insignificant waves.

3. Means for diminishing the effect of insignificant waves in accordance with claim 2, wherein the means for energizing the second circuit comprise a light-sensitive cell, a light source arranged to cast a beam upon said cell, and set in operation by the actuation of the wave-propagating device to vary in predetermined sequence the intensity of the light beam falling upon the cell.

4. In a seismic prospecting system including an electrically operated device for propagating waves in the earth, a pickup device for transforming such waves to electrical impulses, a translating device for translating such impulses to intelligible signals, and a transmitting circuit having an input connected with the pickup and an output connected with the translating device for passage of the electrical impulses, means for diminishing the effect upon the translating device of impulses due to insignificant waves arriving at the pickup device in known sequence following actuation of the wave-propagating device, said means comprising a second circuit connected with the transmitting circuit between the input and output thereof and arranged to decrease the amplitude of impulses delivered to the transmitting circuit at its output to the translating device when the said second circuit is energized, and means for controlling energization of the second circuit, said means comprising a light-sensitive cell interrupting the second circuit, a light source arranged to cast a beam upon the light-sensitive cell, a series of shutters movable across the beam to control passage of the beam to the cell, the shutters being adjustable to intercept selected parts of the beam to permit predetermination of the operation of the cell, and means operated by the actuation of the wave-propagating device for setting the series of shutters in motion across the beam.

5. Means for diminishing the effect upon the translating device of impulses due to insignificant waves in accordance with claim 4, wherein a movable carriage supports the shutters that form the series, said shutters being adjustable thereon to vary the portion of the beam that they respectively intercept, and wherein means controlled by operation of the wave-propagating device initiates movement of the carriage.

6. Means for diminishing the effect upon the translating device of impulses due to insignificant waves in accordance with claim 4, wherein a constant speed, continuously running motor is arranged for moving the series of shutters through the beam, an electrically operated clutch is interposed between the motor and the series of shutters, said clutch being operatively connected with the wave-propagating device for simultaneous operation.

7. Means for diminishing the effect upon the translating device of impulses due to insignificant waves in accordance with claim 4, wherein the second circuit includes a triode having its grid connected with a source of positive charge through the light-sensitive cell, said circuit being arranged to decrease the amplitude of electrical impulses transmitted by the transmitting circuit when current is flowing between the cathode and anode of the said triode.

8. Means for diminishing the effect upon the translating device of impulses due to insignificant waves in accordance with claim 4, wherein the second circuit comprises a by-pass including a triode having a grounded cathode, an anode connected with the transmitting circuit, and a grid connected through the light-sensitive cell with a source of positive charge.

9. Means for diminishing the effect upon the translating device of impulses due to insignificant waves in accordance with claim 4, wherein the transmitting circuit includes an amplifier tube having an anode and cathode, an input grid, and a device for suppressing the effect of the grid, the second circuit being connected with the grid-suppressing device, and said suppressing device operating upon energization of said second circuit.

CARL A. HEILAND.